UNITED STATES PATENT OFFICE.

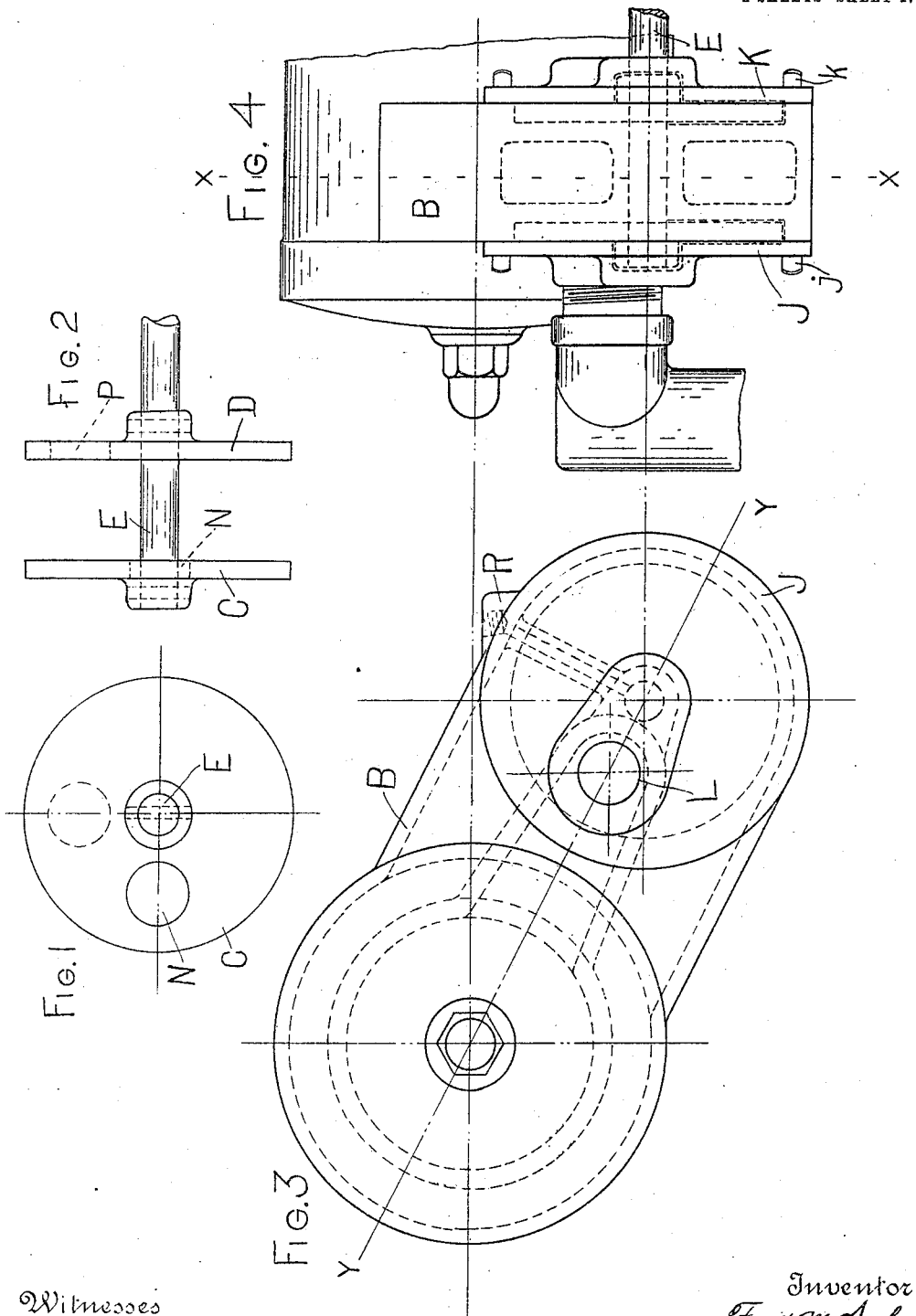

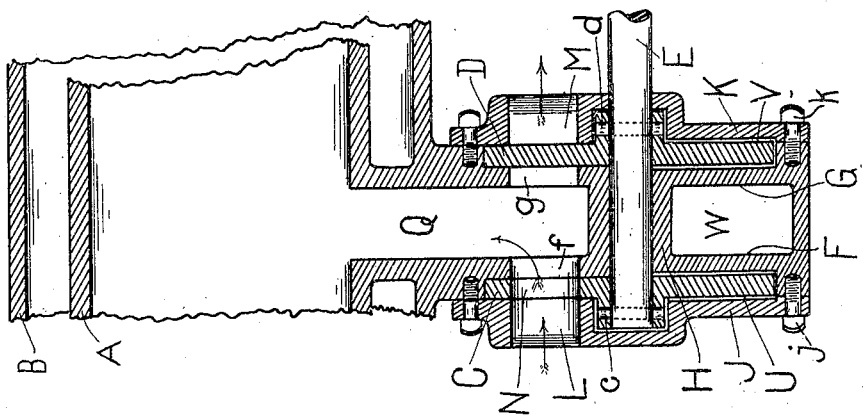
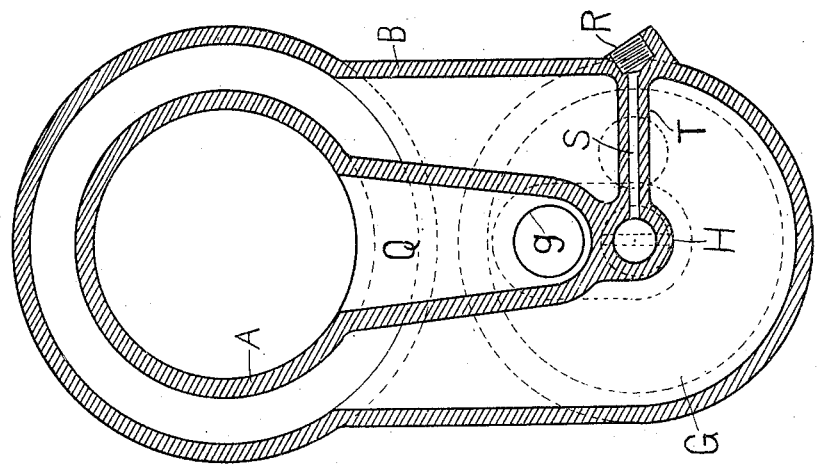

FAYETTE M. SEELEY, OF LANSING, MICHIGAN.

ROTARY VALVE FOR GAS-ENGINES.

No. 808,579.　　　Specification of Letters Patent.　　　Patented Dec. 26, 1905.

Application filed July 14, 1904. Serial No. 216,510.

*To all whom it may concern:*

Be it known that I, FAYETTE M. SEELEY, a citizen of the United States, residing at Lansing, in the county of Ingham and State of Michigan, have invented certain new and useful Improvements in Rotary Valves for Gas-Engines, of which the following is a specification.

My invention relates to rotary valves for gas-engines, and has for its object the production of a device adapted for admitting explosive mixture to the cylinder of a gas-engine and to afford a path for the exhausting of the products of combustion comprising two rotatory disks or plates upon a common shaft and provided with openings appropriately disposed whereby after admission the combined oil or gas and air may be compressed in the customary way before explosion and then exhausted by the return of the piston after explosion.

I am aware that rotary steam-valves and rotary valves for gas-engines have been constructed, and the essential features of my invention are therefore the special construction and arrangement of the valves and their immediate water-jacketed housing.

I accomplish the object set forth by forming and associating the parts as illustrated in the accompanying drawings, of which—

Figure 1 is a plan view of either one of the rotative valve-disks. Fig. 2 represents a side view of the two valve-disks secured upon their common shaft. Fig. 3 is an end view showing the cylinder-head and the position with respect thereto of the housing or casing for the valve-disks. Fig. 4 is a side view of a portion of the cylinder near the head and of the valve-housing. Fig. 5 represents a sectional view along the line X X of Fig. 4, showing the internal arrangement of the walls of the ports and water-jacket, together with the oil-duct. Fig. 6 represents a sectional view of a portion of the cylinder and of the valve-housing taken along the inclined broken line Y Y of Fig. 3.

Like letters are employed to designate the same parts throughout the drawings.

Letter A marks the cylinder-wall, (see Fig. 5,) and letter B the exterior wall extending about the cylinder and the valves, which are marked C and D. The valves are secured upon a common shaft E by pins $c$ and $d$ or in any effective manner. Shaft E is a revoluble shaft and is found in many forms of gas and oil engines. In addition to the exterior curved wall B the valve housing or covering comprises the two diaphragm or partition walls F and G, connected by the bearing H for shaft E, the spaces in which the valves rotate being formed between those partitions and the removable heads J and K, which close the housing externally, being secured thereto by screws $j$ and $k$. Threaded orifice L through the head J, wherein a pipe may be coupled with the housing, affords entrance for the explosive mixture, and a similar orifice M through the head K permits the exhaust of the products of combustion. Each valve-disk is provided with a port. That of valve C is marked by letter N, and that for valve D is designated by the letter P. With respect to each other the valve-ports are not alined, but are removed one from the other by one-fourth of a rotation of either upon the shaft E before being secured. (See Fig. 1.) Considering Fig. 5, it will be understood that starting from the position illustrated with the mixture entering through orifice L, valve-port N, and cylinder-port Q the valve-disks may be turned at such a rate as to bring the orifice M in head K in position to allow the burned gases to be driven out by the advancing piston after explosion.

In Fig. 5 is shown an external and threaded coupling R, to which a cup of lubricating-oil may be fixed, and the oil-duct S, drilled through the auxiliary or brace wall T, delivers lubricant to bearing H for shaft E, and such lubricant finds its way gravitationally into the pockets U and V, formed between the heads J and K and the partition-walls F and G, as illustrated in Fig. 6. It will be observed that the valve-disks run in the oil-pockets without touching the heads and partition-walls and that they are closely met by the heads and partitions during their revolutions in those parts of the housing where the corresponding orifices L and M through heads J and K and the like openings $f$ and $g$ through the partition-walls F and G are located.

In Figs. 5 and 6 it is shown that the water-space W encircles the cylinder and extends between the partition-walls F and G. All parts are therefore practically protected against overheating by ample space for circulating water.

Having thus described my invention and the manner of its operation, what I claim is—

1. In a rotary valve, the combination with an engine-cylinder having a cylinder-port, of a valve-housing, the said housing having circular, depressed valve-seats provided with inlet and exhaust ports in communication with the said cylinder-port, the said housing having a shaft-bearing extending centrally between the said valve-seats, a shaft revoluble in said bearing, disk valves arranged in said seats and secured to the shaft, the said valves having suitably-disposed ports, and detachable heads covering the said valves, substantially as described.

2. In a rotary valve, the combination with an engine-cylinder having a cylinder-port, of a valve-housing, the said housing having circular, depressed valve-seats provided with inlet and exhaust ports in communication with the said cylinder-port, a portion of the said valve-seats being deepened to form oil-pockets, the said housing having a shaft-bearing extending centrally between the said valve-seats, a shaft revoluble in said bearing, disk valves arranged in said seats and secured to the shaft, the said valves having suitably-disposed ports, and detachable heads covering the said valves, substantially as described.

3. In a rotary valve, the combination with an engine-cylinder having a cylinder-port and a water-jacket, of a valve-housing, the said housing having circular, depressed valve-seats provided with inlet and exhaust ports in communication with the said cylinder-port, the said housing having a shaft-bearing extending centrally between the said valve-seats, the said housing having an extension of the water-jacket of said cylinder whereby water is conducted between the said valve-seats and around the bearing, a shaft revoluble in the said bearing, disk valves arranged in said seats and secured to the shaft, the said valves having suitably-disposed ports, and detachable heads covering the said valves, substantially as described.

In testimony whereof I affix my signature in presence of two witnesses.

FAYETTE M. SEELEY.

Witnesses:
WALTER S. FOSTER,
HARRY A. SILSBEE.